US012017533B2

United States Patent
Gäng et al.

(10) Patent No.: US 12,017,533 B2
(45) Date of Patent: Jun. 25, 2024

(54) METHOD FOR A SITUATION-CONTROLLED DISPLAY OF AN ACTUATION ELEMENT

(71) Applicant: MERCEDES-BENZ GROUP AG, Stuttgart (DE)

(72) Inventors: Christoph Gäng, Markdorf (DE); Marko Goller, Ammerbuch-Entringen (DE); Alice Stockmann, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/037,610

(22) PCT Filed: Oct. 21, 2021

(86) PCT No.: PCT/EP2021/079274
§ 371 (c)(1),
(2) Date: May 18, 2023

(87) PCT Pub. No.: WO2022/106150
PCT Pub. Date: May 27, 2022

(65) Prior Publication Data
US 2023/0322081 A1    Oct. 12, 2023

(30) Foreign Application Priority Data

Nov. 19, 2020   (DE) ..................... 10 2020 007 067.1

(51) Int. Cl.
*B60K 35/00*   (2024.01)
*B60K 35/10*   (2024.01)
(Continued)

(52) U.S. Cl.
CPC .............. *B60K 35/00* (2013.01); *B60K 35/10* (2024.01); *B60K 35/28* (2024.01); *B60K 35/29* (2024.01);
(Continued)

(58) Field of Classification Search
None
See application file for complete search history.

(56) References Cited

U.S. PATENT DOCUMENTS 9,963,012 B2    5/2018  Stevanovic et al.
2010/0182137 A1  7/2010  Pryor
(Continued)

FOREIGN PATENT DOCUMENTS

CN    205292332 U    6/2016
CN    109823176 A    5/2019
(Continued)

OTHER PUBLICATIONS

Lambert, Tesla sends in-car warning to owners about upcoming power outage, recommends full charge, Oct. 9, 2019, Electrek (Year: 2019).*

(Continued)

*Primary Examiner* — James J Lee
*Assistant Examiner* — Andrew Sang Kim
(74) *Attorney, Agent, or Firm* — PATENT PORTFOLIO BUILDERS PLLC

(57) ABSTRACT

A method for a situation-controlled display of an actuation element for a function in a vehicle on a touch-sensitive display surface operable by a person using the vehicle involves the actuation element as a blocking element for a window lifter of the vehicle. The actuation element is always displayed if a child is detected on a seat in the vehicle, and a window lifter associated with the seat is actuated, if a contradicting actuation of window lifters for the same window is carried out, the window lifters being accessible to different people in the vehicle, and/or if the occurring actuation of the window lifters deviates from the conventional actuation type.

3 Claims, 1 Drawing Sheet

Figure 1:
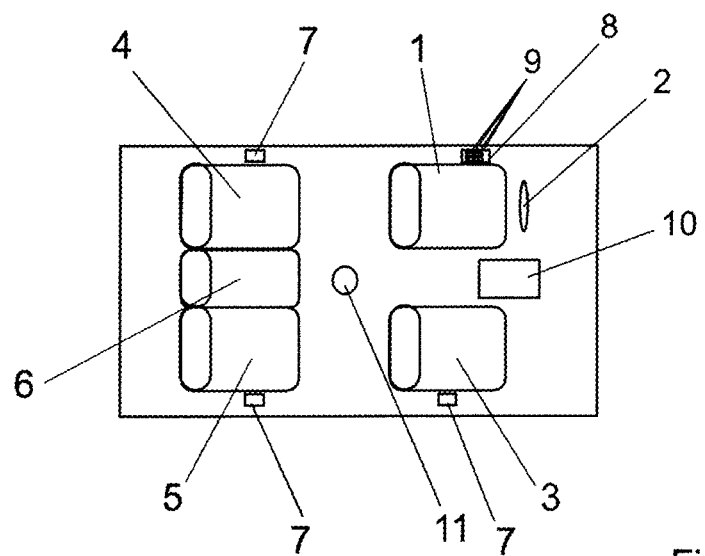

(51) Int. Cl.
  *B60K 35/28* (2024.01)
  *B60K 35/29* (2024.01)
  *B60K 35/60* (2024.01)
  *B60K 35/65* (2024.01)
(52) U.S. Cl.
  CPC ............ *B60K 35/60* (2024.01); *B60K 35/656* (2024.01); *B60K 2360/1438* (2024.01); *B60K 2360/176* (2024.01); *B60K 2360/1876* (2024.01); *B60K 2360/197* (2024.01); *B60K 2360/785* (2024.01)

(56) References Cited

U.S. PATENT DOCUMENTS

| | | | |
|---|---|---|---|
| 2016/0305178 | A1 | 10/2016 | Disley et al. |
| 2017/0013188 | A1* | 1/2017 | Kothari .................... G06F 3/017 |
| 2020/0131839 | A1 | 4/2020 | Iwano et al. |
| 2020/0254875 | A1 | 8/2020 | Strandberg |
| 2021/0149397 | A1* | 5/2021 | Shin .................... G06V 10/764 |
| 2023/0211663 | A1* | 7/2023 | Moreau .................... B60R 1/26 701/36 |

FOREIGN PATENT DOCUMENTS

| | | |
|---|---|---|
| CN | 110869235 A | 3/2020 |
| CN | 111301330 A | 6/2020 |
| DE | 19918353 A1 | 10/2000 |
| DE | 102010011319 A1 | 9/2011 |
| DE | 102015006075 A1 | 2/2016 |
| DE | 102016123278 A1 | 6/2017 |
| DE | 102018104065 A1 | 8/2018 |
| DE | 102018008784 A1 | 6/2019 |
| JP | 2007141188 A | 6/2007 |
| JP | 2009068265 A | 4/2009 |
| JP | 2011020539 A | 2/2011 |
| JP | 2013029004 A | 2/2013 |
| JP | 2013049968 A | 3/2013 |
| JP | 2016030478 A | 3/2016 |
| JP | 2017166240 A | 9/2017 |
| WO | 2016066197 A1 | 5/2016 |
| WO | 2019034466 A1 | 2/2019 |

OTHER PUBLICATIONS

Merged English Translation and Original CN 106985750 A (Year: 2017).*
Whitwam, Five key new features of Android Auto's big 2019 update, Android Police (Year: 2019).*
International Search Report and Written Opinion dated Jan. 21, 2022 in related/corresponding International Application No. PCT/EP2021/079274.
Office Action created Oct. 14, 2021 in related/corresponding DE Application No. 10 2020 007 067.1.
Office Action dated Oct. 29, 2023 in related/corresponding CN Application No. 202180077137.5.
Notice of Reasons for Refusal dated Oct. 31, 2023 in related/corresponding JP Application No. 2023-530026.

* cited by examiner

METHOD FOR A SITUATION-CONTROLLED DISPLAY OF AN ACTUATION ELEMENT

BACKGROUND AND SUMMARY OF THE INVENTION

Exemplary embodiments of the invention relate to a method for a situation-controlled display of an actuation element.

In practice, it is now the case that the vast majority of vehicles allow a plurality of parameters to be controlled. This makes it possible to control individual functions of the vehicle in a targeted manner, and numerous settings can be adjusted according to the preferences or habits of a person driving the vehicle. In order to make this plurality of functions controllable, a touch-sensitive surface is frequently present, which is designed as a touchscreen and provides the individual functions within a plurality of different menus. The disadvantage of this is that the required functions must first be searched for or that it is often necessary to scroll through several menus for individual functions in order to then be able to call up the corresponding function in a submenu. This is relatively complex and time-consuming. Particularly when functions are selected while the vehicle is moving, this would distract a person driving the vehicle significantly and for a comparatively long period of time, which is a serious disadvantage in terms of road safety.

WO 2016/066197 A1 therefore describes a method for assisting a user in operating a function of a vehicle, in which, depending on the situation, various actuation elements are moved up in the menu structure or are displayed directly on the home screen, such that the problem of scrolling through menus and submenus no longer occurs and the potential impairment to road safety triggered by this is minimized.

In the method according to embodiments, it is the case that a situation-controlled display of an actuation element for a function in the vehicle takes place on an operable touch-sensitive display surface. According to the invention, the actuation element is designed as a blocking element for the window lifter of the vehicle. It is always displayed if a child is detected on a seat and a window lifter associated with said seat is actuated, if a contradicting actuation of window lifters for the same window is carried out, the window lifters being accessible to different people in the vehicle, and/or if the occurring actuation of the window lifters deviates from the conventional actuation type. The blocking element for window lifters, which can also be referred to as a blocking button, is displayed on the uppermost level in accordance with the situations described in the vehicle. On the one hand, this makes it possible to eliminate the need for a blocking button as a hardware design, which saves installation space, assembly effort and costs. On the other hand, it is the case that the special situational evaluation and adaptation of the display to these situations means that the blocking button is nevertheless available quickly and efficiently to a person using the vehicle, for example a person driving the vehicle.

One situation may be the presence of a child, either in the rear or on the front passenger seat, who is operating the corresponding window, either deliberately or accidentally. In this case, it is important to be able to block the window appropriately quickly, for example to prevent objects or even the child itself from falling out of the vehicle. By means of the method according to the invention, in such a situation the blocking button is immediately displayed on the uppermost level of the operable touch-sensitive display surface, such that, comparable to an expensive and complex hardware switch, it is possible to intervene extraordinarily quickly and efficiently.

Another situation in which such rapid intervention is useful or at least desirable is a contradictory actuation of different window lifters for the same window. If, for example, the window associated with the respective seat is opened by a person in the rear or front passenger area and the window is closed again by the person driving the vehicle, the other person may try to open the window again and the person driving the vehicle may try to close the window again. In such a situation, too, it must be assumed that the person driving the vehicle definitely wants to keep the window closed, for example for safety reasons. In such a situation, it is also useful if, in accordance with the method according to the invention, the blocking button is shown on the uppermost level of the operating surface, for example of a central touchscreen, in order, for example, to offer the person driving the vehicle the option of resolving the situation by blocking the window lifter.

A further critical possibility is when the occurring actuations of the window lifters deviate from the conventional actuation type. Thus, for example, one-time opening and closing, for example for brief airing or the like, can be quite reasonable and falls under the conventional actuation type. Playing around with the window lifter, for example by constantly opening and closing it, frequently stopping and restarting the movement of the window, or the like, can therefore be detected as unconventional actuation. This could also include the previously described situation of contradictory actuations by different persons. In such a situation, the blocking button can also be presented accordingly via the touchscreen, for example to enable the person driving the vehicle to intervene and block the affected window lifter if necessary or desired.

As an alternative to the person driving the vehicle, the actuation can, for example, in the case of a touch display arranged in the center console, also be carried out by the person located on the front passenger seat if, for example, the undesired actuation of window lifters is carried out in the rear area, i.e., in particular, by passengers or children, while the two adults in the front area can then, if necessary, quickly and efficiently block the affected window lifter via the blocking element arranged in the uppermost level of the display surface.

According to a very favorable development of the method according to the invention, the presence of at least one child is detected by recognizing this in a camera-based manner, on the basis of a login profile, and/or a mounted child seat.

These options are particularly simple and efficient for detecting the presence of a child accordingly and thus, for the first case of the method according to the invention, for determining that a child is present, for example on the front passenger seat or in particular in the rear. If the window lifter associated with the child's seat is then actuated, the blocking element for this window lifter is immediately shown on the touchscreen to enable a supervisor for the child, for example the person driving the vehicle, to intervene here if he or she deems this necessary. This can be done simply and efficiently without having to scroll through various menus and submenus to locate the function accordingly.

According to an extraordinarily favorable further development of the method according to the invention, it is such that the conventional actuation type is predefined or learned based on logged actuations of the individual window lifters in the past. Such logging then forms the basis of the "normal" actuation. According to an exceptionally favorable development of the idea, it can be provided that a deviation from the conventional actuation type is always detected when a higher number of actuations takes place within a predefined period of time than takes place within the scope of the conventional actuations. Thus, if a window is raised and lowered within a few seconds, or this operation is repeated several times within a predefined period of time, this may indicate that this is an unconventional actuation. On the other hand, the system can also detect different actuation profiles and learn them over time if, for example exactly this actuation type, that the window is opened and closed again several times, corresponds to the normal case. In this case, no deviating actuation would then be detected and the blocking button would not be shown on the uppermost level accordingly.

A further very favorable embodiment thereof provides that the conventional actuation type is stored on a back-end server, i.e., a server external to the vehicle, such as that operated by the vehicle manufacturer. The value can then be determined and calculated accordingly from the data of many individual users, thus providing relatively generally valid profiles for a plurality of vehicles, which in turn can be further developed in the manner described above using specific information in the user profiles for each individual user. The system can thus learn on the basis of a general/normal actuation type in order to accordingly recognize reliable values as quickly as possible. By relying on the backend server, high computing power and optionally the use of AI is easily possible.

An exceptionally favorable development of the method according to the invention can further provide that the blocking element is only displayed on the uppermost level of the operable display surface if no safety-relevant warnings and/or images of a rear view camera or front camera or other displays relevant to ASIL (Automotive Safety Integrity Level) are displayed. Such safety-relevant data or data directly required for the use of the vehicle, such as camera images from a rear view camera or safety-relevant warnings, then have priority over a display of the blocking element in any case so that there is no case of such warnings or images being covered by the blocking element and possibly not being detected or suddenly no longer being visible in a possibly critical situation, for example when parking.

A further very favorable embodiment of the method according to the invention can further provide that, at least when a child is detected, an operating element for the window lifter triggering the display is displayed in addition to the blocking element. This means that not only can the actuation of the window lifter be blocked and the state effectively frozen, but in addition precisely this window lifter can be appropriately controlled and operated via the display surface in order, for example, not only to be able to block in its path a window in the rear that has been opened inadvertently by a child, but also subsequently to be able to close it again quickly and conveniently.

A further very favorable embodiment thereof also provides that when the operating element is additionally shown, the latter is given priority over the control of the window by the window lifter. The control via the shown operating element thus has a higher priority and, in case of doubt, directly "overrides" the input by the window lifter. This ensures that, in such a situation, the operating element on the display surface has priority in every case, such that, for example, a window in the rear is controlled by the person operating the touchscreen even against the continued operation of the window lifter.

In addition, an advantageous development of the method according to the invention can provide that, in addition to the blocking element, and optionally to the operating element, an image, captured by an interior camera, of the person who is operating the window lifter triggering the display is displayed. The person can preferably be a person sitting in the rear. A person operating the vehicle, for example a person driving the vehicle, is thus shown which person is operating the switch, so that the person operating the vehicle can address the person by name, for example, and optionally also determine why they have operated the window lifter. If, for example, this person is not in good health, the person operating the vehicle can recognize this in the camera image displayed to him/her and can, for example, refrain from blocking the window lifter so that the other person is supplied with fresh air. In addition, he or she may stop if necessary or address the person specifically. This does not require turning around, so that distraction from traffic is far smaller than would be the case in such a situation with conventional technology.

As already mentioned, a vehicle having a touch-sensitive display surface and electric window lifters in the front area and in the rear area of the vehicle, and having a controller, can be specified as a preferred intended use for the method, the controller being configured to accordingly carry out the method in accordance with one or more of the variants described.

Further advantageous embodiments of the method according to the invention and the vehicle also follow from the exemplary embodiment, which is described in more detail below with reference to the figures.

BRIEF DESCRIPTION OF THE DRAWING FIGURES

Figure 2:
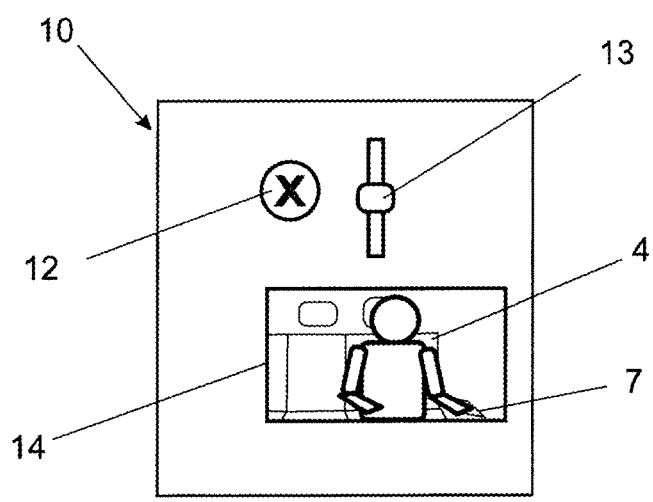

In the drawings:

FIG. 1 is a schematic representation of an interior of a vehicle with a view from above; and FIG. 2 is a schematic representation of a possible type of display on a touch-sensitive display surface.

DETAILED DESCRIPTION

In the illustration of FIG. 1, a vehicle interior is shown in a view from above. A seat 1 is shown in the so-called front area of the vehicle in the direction of travel F, which seat is to be assigned to a person driving the vehicle. For this purpose, a schematic steering wheel 2 is indicated accordingly. Located beside this, the so-called front passenger seat is designated by the reference sign 3. In the so-called rear of the vehicle in the direction of travel F, behind the person driving the vehicle, a seat designated as 4 and, beside it, a seat designated as 5, as well as an emergency seat 6 in between, are shown schematically. Each of the seats 3, 4, 5 is assigned a separate window lifter 7, which can typically be implemented in the manner of a hardware switch, but in principle also as a touch-sensitive surface or the like. Beside the seat 1 of the person driving the vehicle, there is usually a control panel 8 with window lifters 9 for each individual window in the vehicle.

In addition, a touch-sensitive operable display surface 10, for example a touchscreen in the area of the center console, is also arranged in the interior of the vehicle. The interior of the vehicle is also intended to have an interior camera indicated here in the center and designated as 11.

In practice, in vehicles with automatic window lifter functions, i.e., window lifters 7 in the front area and in the rear of the vehicle, it makes sense and is necessary as a function of the vehicle that at least the person driving the vehicle, who is in seat 1, can block the window lifters 7 of the other seats, and in this case in particular the window lifters 7 in the area of seats 4 and 5 in the rear of the vehicle. It is thus possible to ensure that children traveling on board cannot throw things out of the vehicle, cannot fall out of the window, and cannot use the window lifters 7 as a toy by constantly raising and lowering the windows. In order to be able to dispense with a blocking button in hardware form, such an actuation element can be integrated as a blocking element 12 for the window lifters into software of the vehicle. The persons using the vehicle can then operate this function via the touchscreen 10. Typically, it is the case that not all functions can be accommodated in the uppermost level of the software, which means that persons frequently have to scroll through submenus to switch certain functions of the vehicle on and off, which is correspondingly laborious, and which is not expedient in any case in a situation in which, for example, a child is in danger of falling out of the window. For this reason, a blocking element 12 is displayed on the touchscreen 10 in a situation-controlled manner whenever the availability of such a blocking element appears necessary.

An enlarged section of the touchscreen 10 is shown again in the illustration of FIG. 2. A blocking element, denoted by 12, for the window lifters 7 is shown on the touchscreen. The display in the upper level takes place whenever one of the following scenarios occurs, whereby a situation is given in which the blocking button 12 appears necessary for rapid intervention, for example, by the person located on the seat 1.

The first situation could be that a child is seated, for example, in the rear on the seats 4 or 5 and accordingly actuates the window lifter 7 associated with these seats 4, 5. The blocking element 12 is then displayed on the touchscreen 10, so that, for example, the person sitting on the seat 1 or also on the seat 3 can directly and immediately interrupt the actuation of the window lifter 7 and thus the opening or closing of the window. A child can be detected, for example, by the interior camera 11 or also by a corresponding login profile, the occupancy of a seat, or the detection of a child seat, for example on one of the seats 4 and/or 5 in the rear of the vehicle.

In addition to simply blocking the window lifter 7 associated with this seat 4 or 5 via the blocking element 12, it can then also be useful to accordingly provide an actuation for the window on the touchscreen 10, for which a control element designated here as 13 is shown, for example, in the form of a virtual sliding switch, so that the person intervening can not only block the function of the window lifter 7 but also open and close the window. The person located on the seat 1 could in principle also do this via the control panel 8 and the window lifter arranged there for the respective window. For this purpose, however, he or she would have to determine which of the windows has been opened so that the operating element 13, in particular in combination with the blocking element 12, enables the simpler and more efficient way of intervening. It is of course the case that an actuation of the operating element 13 has priority over the actuation of the respective window lifter 7, so that it is possible to actively intervene here and override any actuation by the window lifter 7.

In addition, an image from the interior camera 11, which shows the seat or the person 15 thereon who is correspondingly actuating the window lifter 7 associated with this seat 4, 5, can also be shown on the touchscreen 10 in the area designated as 14 in the illustration of FIG. 2. This enables, for example, the person driving the vehicle to address the corresponding person 15, for example a child, by name without having to turn around to see who has opened the window in the case of, for example, two children.

A further scenario that leads to the blocking element 11 being shown in the uppermost level of the touchscreen 10 can be the detection of conflicting wishes, This means that the window lifter 7 and the window lifter 9 associated with the same window are actuated alternately in order to raise and lower the window. Such a conflict potential can be detected by performing periodic logging of all actuations triggered by the window lifters 7, 9. In this case, it is logged when the person located on the seat 1 raises or lowers the windows and whether one of the passengers on the seats 3, 4 or 5 with the window lifter 7 associated with these seats and windows also raises or lowers the windows. If this is the case, wherein in particular a time limit can be predefined within which this takes place, conflicting wishes of the individual persons are detected and at least the blocking element 12, but in particular also the operating element 13 and the image data in the area 14 of the touchscreen 10, can be shown.

Furthermore, a conventional actuation type can also be defined as a baseline and/or determined from actually recorded logged data. If there is a deviation from this baseline, for example as a result of the window being quickly raised and lowered again more frequently than usual, or different wishes of the persons being entered via the window lifters 7 and 9, which leads to opposing operation, then the blocking element 12 can also be offered on the touchscreen 10. Such data, as well as predefined time elements for the event of actuation of the window can also be stored in a server external to the vehicle, such as a vehicle backend. If a counteraction is detected within a predefined time period, for example between the window lifters 7 in the rear area and one of the window lifters 9 in the front area, appropriate measures can be taken and the blocking element 12 can be shown on the uppermost level of the touchscreen 10.

The blocking element 12 on the touchscreen 10 thus offers a direct interaction option without depth in the described particularly relevant situations for blocking window lifters, so that the person who wants to block the window lifters 7 in the rear or front passenger seat 3 for the reasons mentioned can trigger this functionality directly and without having to enter deeper menus of the software.

By using the vehicle backend, the data of various users can be combined and combined to form a mean "normal" baseline. In addition, a separate development of this generally valid profile can now be carried out according to a user profile, for example by detecting and storing user-specific actuations of the window lifters over time using machine learning, so that over time the user profiles adapt better and better to the actual behavior of the user. The higher computing power of the backend compared to the vehicle also makes it possible, for example, to use artificial intelligence (AI) to evaluate the data.

The blocking element 12 can thus preferably be shown in such situations. In this case, it is possible to dispense with showing the blocking element when other important features have to be shown on the touchscreen, such as, for example, the images of a parking camera, important warning messages or the like. These are then not superimposed, such that this information cannot be lost.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for a situation-controlled display of an actuation element for a function in a vehicle on a touch-sensitive display surface operable by a person using the vehicle, wherein
the actuation element is a blocking element for a window lifter of the vehicle,
wherein the actuation element is always displayed when a child is detected on a seat in the vehicle and a window lifter associated with the seat is actuated,
wherein the actuation element is always displayed when a contradicting actuation of window lifters for a same window is performed, where the window lifters for the same window are accessible to different people in the vehicle,
wherein the actuation element is always displayed when an occurring actuation of window lifters deviates from an actuation type that is a baseline or an actuation type determined from recorded logged data, and
wherein the baseline actuation type is predefined or the actuation type determined from the recorded logged data is learned based on logged prior actuations of individual window lifters.

2. A method for a situation-controlled display of an actuation element for a function in a vehicle on a touch-sensitive display surface operable by a person using the vehicle, wherein
the actuation element is a blocking element for a window lifter of the vehicle,
wherein the actuation element is always displayed when a child is detected on a seat in the vehicle and a window lifter associated with the seat is actuated,
wherein the actuation element is always displayed when a contradicting actuation of window lifters for a same window is performed, where the window lifters for the same window are accessible to different people in the vehicle,
wherein the actuation element is always displayed when an occurring actuation of window lifters deviates from an actuation type that is a baseline or an actuation type determined from recorded logged data, and
wherein a deviation from the baseline actuation type is always detected when a higher number of actuations occurs within a predefined period of time than occurs a scope of baseline actuations.

3. A method for a situation-controlled display of an actuation element for a function in a vehicle on a touch-sensitive display surface operable by a person using the vehicle, wherein
the actuation element is a blocking element for a window lifter of the vehicle,
wherein the actuation element is always displayed when a child is detected on a seat in the vehicle and a window lifter associated with the seat is actuated,
wherein the actuation element is always displayed when a contradicting actuation of window lifters for a same window is performed, where the window lifters for the same window are accessible to different people in the vehicle,
wherein the actuation element is always displayed when an occurring actuation of window lifters deviates from an actuation type that is a baseline or an actuation type determined from recorded logged data, and
wherein the actuation type determined from the recorded logged data is stored or is evaluated on a server external to the vehicle.

* * * * *